(12) United States Patent
Bittner

(10) Patent No.: US 11,737,447 B2
(45) Date of Patent: Aug. 29, 2023

(54) INVERTED TRUSS GEOMETRY FOR AGRICULTURAL SPRAY BOOM

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 302 days.

(21) Appl. No.: 16/440,308

(22) Filed: Jun. 13, 2019

(65) Prior Publication Data

US 2020/0390080 A1 Dec. 17, 2020

(51) Int. Cl.
  *A01M 7/00* (2006.01)
(52) U.S. Cl.
  CPC ........ *A01M 7/0075* (2013.01); *A01M 7/0082* (2013.01)
(58) Field of Classification Search
  CPC .............. A01M 7/0075; A01M 7/0082; A01M 7/0078; A01M 7/0071
  See application file for complete search history.

(56) References Cited

U.S. PATENT DOCUMENTS

| | | | |
|---|---|---|---|
| 1,654,152 A | 12/1927 | Tregillus | |
| 4,034,779 A | 7/1977 | Townsend | |
| 4,039,147 A * | 8/1977 | Hugg | A01M 7/0075 239/167 |
| 4,138,063 A * | 2/1979 | Batts | A01M 7/0075 239/168 |
| 4,711,398 A * | 12/1987 | Ganderton | A01M 7/0071 428/218 |
| 5,029,757 A * | 7/1991 | Bourgault | A01M 7/0053 239/169 |
| 5,178,328 A * | 1/1993 | Broyhill | A01M 7/0075 239/168 |
| 5,927,606 A * | 7/1999 | Patterson | A01M 7/0075 239/167 |
| 5,992,759 A * | 11/1999 | Patterson | A01M 7/0075 239/168 |

(Continued)

FOREIGN PATENT DOCUMENTS

| | | |
|---|---|---|
| CN | 107027731 | 8/2017 |
| DE | 3823530 | 1/1990 |
| DE | 102016114425 | 2/2018 |

*Primary Examiner* — Joseph A Greenlund
(74) *Attorney, Agent, or Firm* — Rebecca L. Henkel

(57) ABSTRACT

A boom truss structure for an agricultural sprayer that includes boom segments on either side of the sprayer, including primary boom segments, secondary boom segments attached to the primary boom segments at a first hinge, and breakaway boom segments attached to the secondary boom segments at a second hinge. The primary boom segment includes truss elements extending upwardly from a base support member. The secondary boom also includes a base support member, but with an inverted underside truss support member that is located underneath the base support member instead of on top of the base support member. This allows the secondary boom segment to fold on top of the primary boom segment in a compact manner about a lower pivot axis. Additionally, the breakaway boom segment may be folded initially about the secondary boom segment, after which the secondary boom segment is folded about the primary boom segment.

20 Claims, 11 Drawing Sheets

(56) References Cited

U.S. PATENT DOCUMENTS

| | | | | |
|---|---|---|---|---|
| 6,027,039 | A * | 2/2000 | Mercil | A01M 7/0075 239/161 |
| 6,035,942 | A | 3/2000 | Smith et al. | |
| 6,059,201 | A * | 5/2000 | Weddle | A01M 7/0053 239/164 |
| 6,085,993 | A * | 7/2000 | Beggs | A01M 7/0071 239/166 |
| 6,837,446 | B1 * | 1/2005 | Jesse | A01M 7/006 239/161 |
| 7,364,096 | B1 | 4/2008 | Sosnowski et al. | |
| 7,431,221 | B2 * | 10/2008 | Thompson | A01B 73/065 239/168 |
| 8,746,589 | B2 * | 6/2014 | Barker | B60P 3/2215 239/159 |
| 9,093,583 | B2 * | 7/2015 | Hamilton | H02S 20/10 |
| 9,828,771 | B2 * | 11/2017 | Barker | B60P 3/2215 |
| 9,848,592 | B2 * | 12/2017 | Peters | A01M 7/0071 |
| 11,234,432 | B2 * | 2/2022 | Bartlett | A01M 7/0078 |
| 2004/0238659 | A1 * | 12/2004 | Wubben | A01M 7/0075 239/166 |
| 2006/0201075 | A1 * | 9/2006 | Rivas | A01M 7/0071 52/111 |
| 2012/0091227 | A1 * | 4/2012 | Bisson | A01M 7/0071 239/159 |
| 2013/0062432 | A1 * | 3/2013 | Barker | E04C 3/04 239/159 |
| 2013/0092753 | A1 * | 4/2013 | Barker | A01M 7/0075 16/367 |
| 2014/0259897 | A1 * | 9/2014 | Godbole | A01C 21/002 47/1.5 |
| 2015/0098753 | A1 * | 4/2015 | Kuphal | A01C 23/008 403/83 |
| 2016/0038961 | A1 | 2/2016 | Carlson et al. | |
| 2016/0262371 | A1 * | 9/2016 | Hiddema | A01M 7/0067 |
| 2017/0000103 | A1 * | 1/2017 | Wissler | A01M 7/0071 |
| 2017/0086449 | A1 * | 3/2017 | Hiddema | B21C 23/142 |
| 2017/0216871 | A1 * | 8/2017 | Klemp, Jr. | B05B 15/628 |
| 2017/0303462 | A1 * | 10/2017 | Ribotta | A01B 73/044 |
| 2017/0354137 | A1 * | 12/2017 | Dahlhauser | A01M 7/0064 |
| 2018/0243593 | A1 * | 8/2018 | Langbein | B66F 17/006 |
| 2019/0246620 | A1 * | 8/2019 | Hiddema | A01M 7/0071 |
| 2020/0085032 | A1 * | 3/2020 | Lasne | A01M 7/0075 |
| 2020/0390080 | A1 * | 12/2020 | Bittner | A01M 7/0082 |
| 2021/0051941 | A1 * | 2/2021 | Bittner | A01M 21/043 |
| 2021/0051942 | A1 * | 2/2021 | Bittner | B05B 1/20 |
| 2021/0051943 | A1 * | 2/2021 | Bittner | B05B 1/202 |

* cited by examiner

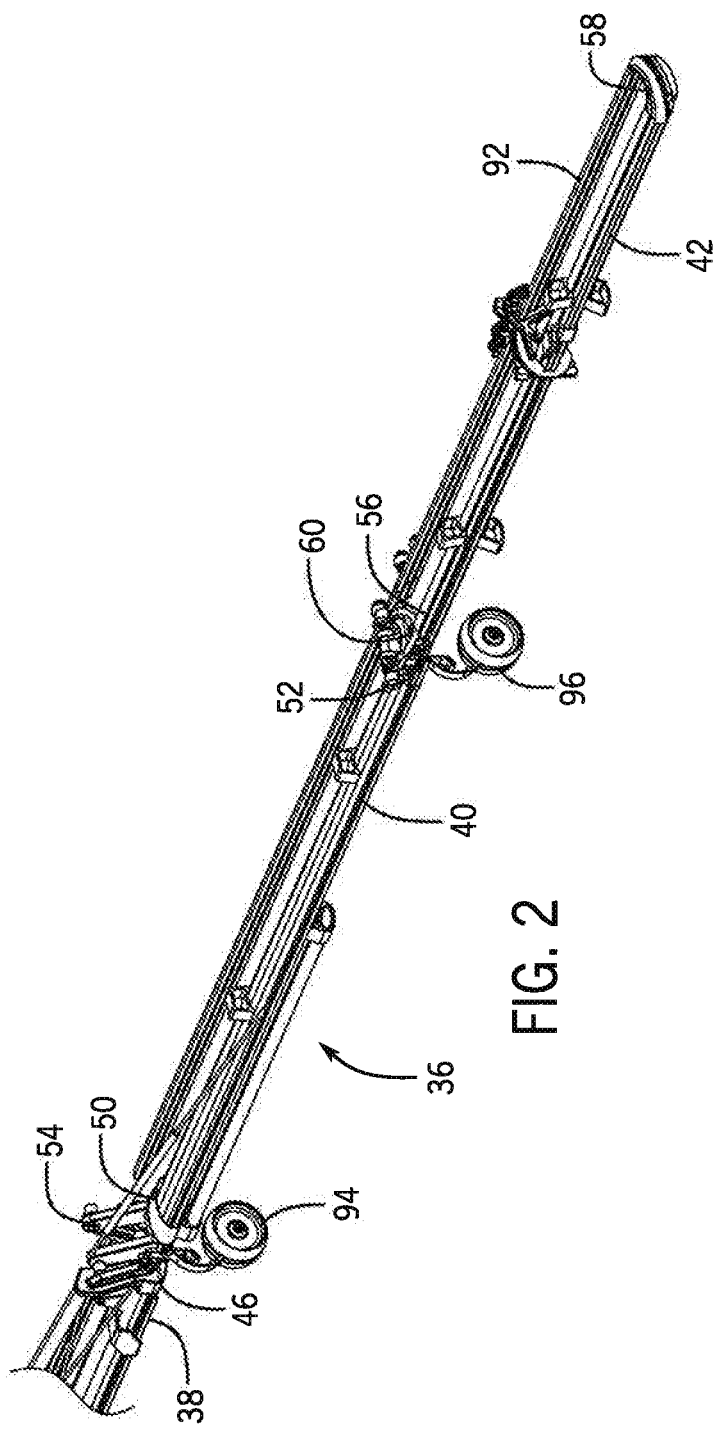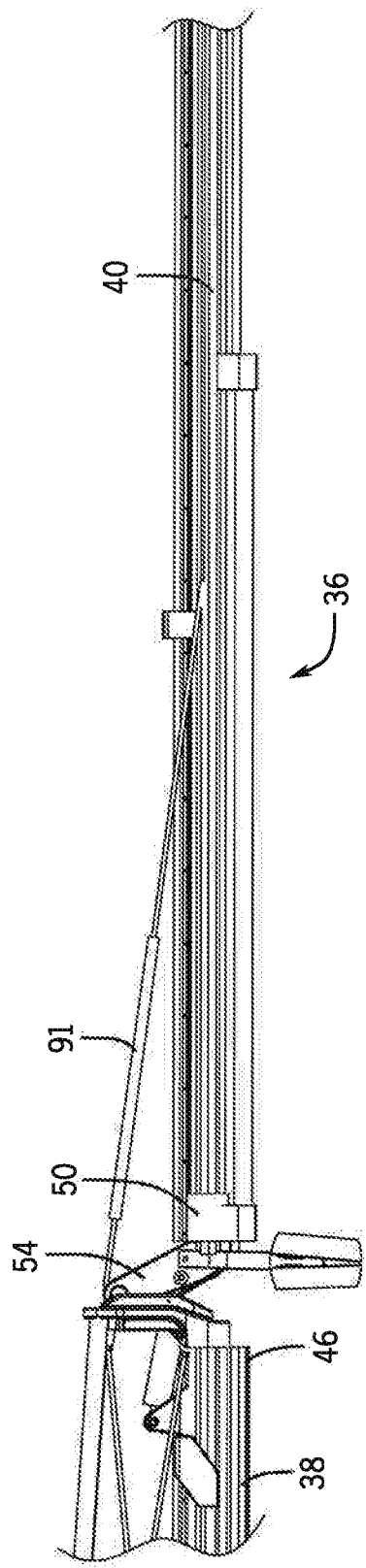
FIG. 2
FIG. 3

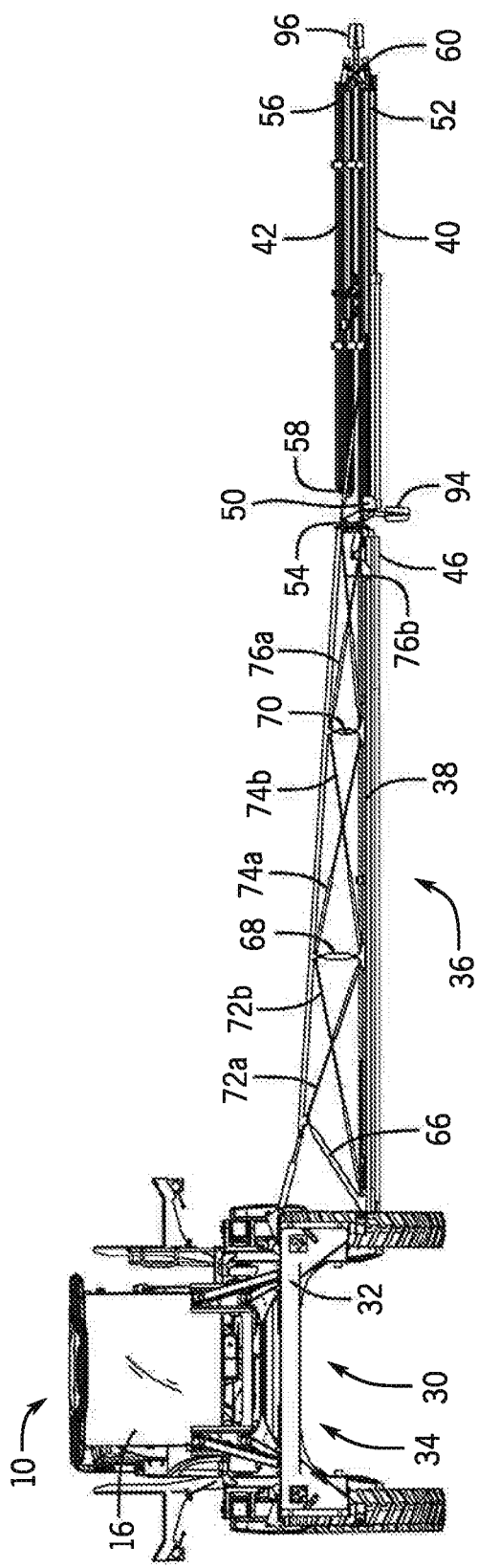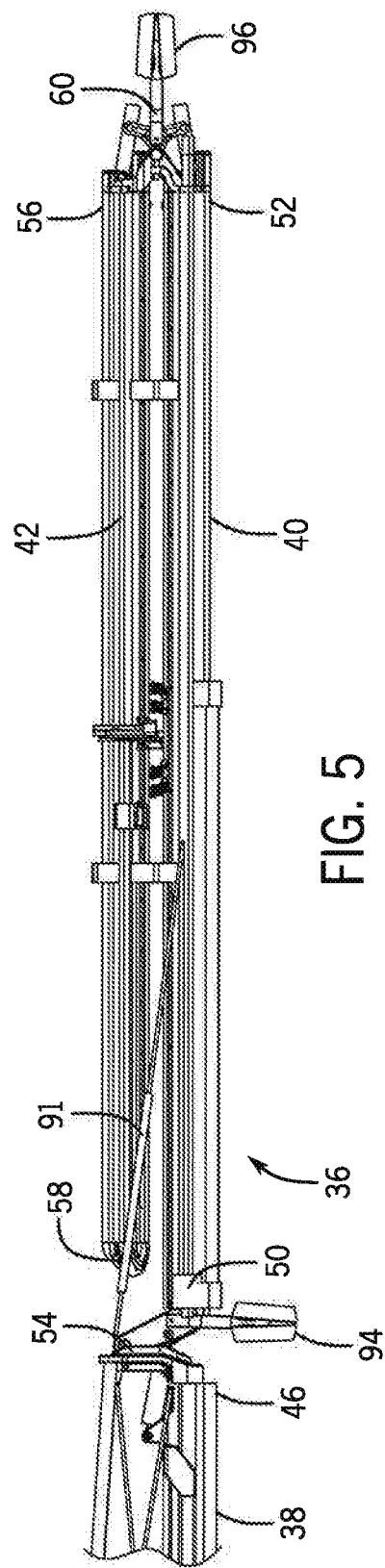

INVERTED TRUSS GEOMETRY FOR AGRICULTURAL SPRAY BOOM

FIELD OF THE INVENTION

The present invention relates generally to a spray boom truss structure for an agricultural sprayer, and, more particularly, a spray boom truss structure having multiple pivot axes that allow the transport width and height to be reduced. The present invention also relates to a spray boom truss structure with a secondary boom segment having a base support member and an underside truss support member, where the secondary boom segment can be pivoted relative to a primary boom segment to result in the inversion of the secondary boom segment when the truss structure is moved to a folded configuration.

BACKGROUND OF THE INVENTION

As spray booms get larger over time, it is increasingly more difficult with conventional boom structure and hinges to fold the components into a small enough package for transport or storage of the sprayer. The bulkiness of this folded package, especially on larger sprayers ends up causing the sprayer to be either too high or too wide to transport on the roads. Additionally, the bulkiness of this folded package may crowd the space near the cab entrance increasing the difficulty of the operator to use the ingress/egress.

Current truss boom designs are typically triangular in cross-section and implement a series of hinges down the length of the cantilevered wing to facilitate folding for transport. These triangular truss booms are bulky when the sprayer is in operation, but also make it increasingly difficult to have a compact folded design. The hinges typically pivot 180 degrees and place an outer portion either on top or alongside the inner portion. Because of the nature of these triangular truss booms, the stacking of these truss boom segments would require a secondary end portion to be vertically stacked above the upper most portion of the primary inner portion of the truss boom segments. As such, folding the boom segments vertically was oftentimes not feasible due to the bulky design.

SUMMARY OF THE INVENTION

The present invention is directed to a boom truss for use with an agricultural machine including a plurality of boom segments. According to one aspect of the invention, the boom truss includes a primary boom segment extending from the agricultural machine and a second boom segment extending from the primary boom segment. The primary boom segment includes a base member having a top side and a bottom side and a support truss structure that extends upwardly from the top side. The support truss structure may include an upper support stringer and a plurality of vertical and diagonal truss elements. The secondary boom segment includes a base support member having an upper side and an underside, as well as an underside truss support member that extends downwardly from the underside. In this way, the secondary boom segment has an inverted structure in comparison to the primary boom segment. The underside truss support member may include a substantially hollow, generally cylindrical carbon fiber tube and at least one bracket extending therefrom. The at least one bracket may be used to secure the substantially hollow, generally cylindrical carbon fiber tube to the base support member of the secondary boom segment. The underside truss support member may be located below a nozzle line that extends along the primary boom segment and the secondary boom segment. Also, the underside truss support member may be located laterally outside of a hinge located between the primary boom segment and the secondary boom segment. Additionally, the boom truss may also include a breakaway boom segment that also has a base support member. The breakaway boom segment may extend from the primary boom segment in an extended position. While a single primary boom segment, a single secondary boom segment, and a single breakaway boom segment have been described, it should be noted that there will be two of each segment extending from either side of a cab of the agricultural machine.

According to another aspect of the invention, the secondary boom segment is movable between multiple positions. This is primarily achieved due to the inverted structure of the secondary boom segment. In a first position, the secondary boom segment extends substantially parallel with the primary boom segment outwardly from the primary boom segment. In this first position, the upper side may extend substantially parallel with the top side, and the underside may extend substantially parallel with the bottom side. In a second position, the secondary boom segment is folded upwardly so that the upper side is located above the top side. Thus, the secondary boom segment may initially move upwardly from the first position until the second boom segment is located directly above the first hinge, after which is it moves downwardly to the second position.

According to yet another aspect of the invention, the boom truss may also include a number of hinges. For instance, a first hinge may be located between the primary boom segment and the secondary boom segment. Due to the location of the underside truss support member, it is located laterally outside of the first hinge. Additionally, a second hinge may be located between the secondary boom segment and the breakaway boom segment. Thus, the second hinge enables the breakaway boom segment to move from the extended position to a partially collapsed position where the breakaway boom segment is folded upwardly so that the breakaway boom is located directly above the secondary boom segment. Thereafter, the secondary boom segment and the breakaway boom segment can be folded together to the second position. When in the second position, the secondary boom segment and the breakaway boom segment may be nested behind the support truss structure. Further still, the boom truss may include a third hinge located where the primary boom segment attaches to the agricultural machine. For instance, the third hinge may be located at a lift arm assembly extending from a front side of the cab of the agricultural machine. The primary boom segment, the secondary boom segment, and the breakaway boom segment may pivot about the third hinge towards the agricultural machine into a retracted transportation position. Again, while only first, second, and third hinges associated with one side of the boom truss are described, it should be noted that similar hinges would be present in boom truss located on the opposite side of the agricultural machine.

According to another aspect of the invention, an agricultural machine includes the boom truss having first and second primary boom segments, first and second secondary boom segments, and first and second breakaway boom segments. Additionally, the machine includes a first hinge located between the first primary boom segment and the first secondary boom segment and a second hinge located between the second primary boom segment and the second secondary boom segment. Furthermore, the machine includes a third hinge located between the first secondary boom segment and the first breakaway boom segment, and a fourth hinge located between the second secondary boom segment and the second breakaway segment. The boom truss is movable between multiple positions. In the first position, the primary boom segments, the secondary boom segments, and the breakaway boom segments extend substantially parallel with one another and laterally from the first and second sides. In the second position, the first and second breakaway boom segments are pivoted about the about the third and fourth hinges such that the first and second breakaway boom segments are located directly above the first and second secondary boom segments. In the third position, the first and second secondary boom segments are pivoted about the first and second hinges such that the first and second secondary boom segments are located directly above the first and second primary boom segments. Thus, the first and second secondary boom segments and the first and second breakaway boom segments may be stacked above the first and second primary boom segments in the third position, and the first and second breakaway boom segments are located between the first and second primary boom segments and the first and second secondary boom segments. Additionally, the machine may further include a fifth hinge located where the first primary boom segment attaches to the lift arm assembly at the first side and a sixth hinge located where the second primary boom segment attaches to the lift arm assembly at the second side. The boom segments may be moved to a third position where the first and second primary boom segments are pivoted about the fifth and sixth hinges towards the back of the machine such that the primary boom segments, the secondary boom segments, and the breakaway boom segments are substantially parallel with the first and second sides.

These and other aspects and features of the present invention will be more fully understood from the following detailed description and the enclosed drawings.

DESCRIPTION OF THE FIGURES

Preferred exemplary embodiments of the invention are illustrated in accompanying drawings in which like reference numerals represent like parts throughout.

FIG. 2 is an enlarged perspective view of the spray boom truss of FIG. 1 in the extended configuration; and FIG. 3 is an enlarged front elevation view of a secondary boom segment of the spray boom truss of FIGS. 1 and 2;

FIG. 4 is a perspective view the agricultural sprayer where the spray boom truss is in a partially folded position;

FIG. 5 is an enlarged front elevation view of the secondary boom segment of the spray boom truss of FIG. 4 where the spray boom truss is in a partially folded position;

Figure 1:
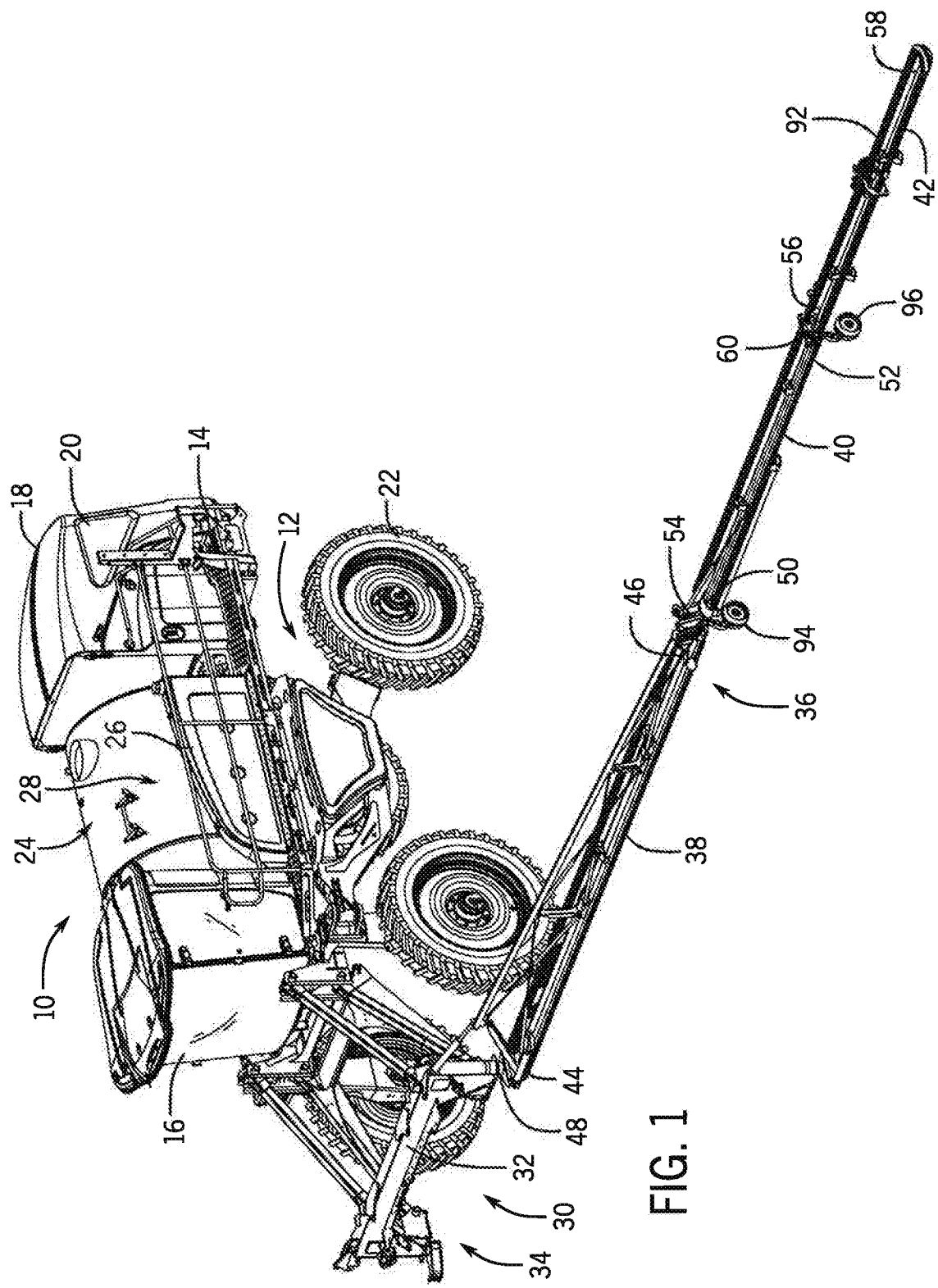
FIG. 1 is a perspective view of an agricultural sprayer having a spray boom truss with inverted truss geometry where the spray boom is in an extended configuration.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of a boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections.

The boom 30 is connected to the chassis 12 with a lift arm assembly 32 that is configured to move the boom 30 up and down for adjusting the height of application of the product. The lift arm assembly 32 is shown in a lifted position in FIGS. 10 and 11. The boom 30 includes a center section 34 that is connected to the lift arm assembly 32, with left and right boom arms 36 that are substantially identical to each other and extend in opposite directions from the boom center section 34. Note, only the left boom aini 36 is shown in the figures, but the right boom arm includes identical components and parts from the left boom arm 36, but in a mirror image. As such, while the various components of the left boom arm 36 are described below, it should be understood that the right boom arm includes the same features but with inverse relation to the sprayer 10.

Each of the boom arm 36 is shown collectively defined by multiple boom segments that are connected longitudinally to provide the corresponding overall width of the assembled boom 30. The boom segments are shown here as the center section 34, with the additional components extending therefrom, including a primary boom segment 38 that connects directly to the center section 34, a secondary boom segment 40 that connects to the primary boom segment 38, and a breakaway boom segment 42 that connects to the secondary boom segment 40. More specifically, the primary boom segment 38 has a first end 44 and a second end 46 opposite the first end 44, where the first end 44 is connected to the center section 34 about a first pivoting hinge 48. The first hinge 48 is configured for generally rearward horizontal pivoting. The secondary boom segment 40 also has a first end 50 and a second end 52, where the first end is pivotably connected to the second end 46 of the primary boom segment 40 at the first end 50 about a second hinge 54. The second hinge 54 is configured for pivoting vertically about a horizontal axis extending therethrough. Similarly still, the breakaway boom segment 42 has a first end 56 and a second end 58 where the first end 56 is pivotably connected to the second end 52 of the secondary boom segment 40 about a third pivoting hinge 60. The third hinge 60 is configured for pivoting vertically about a horizontal axis extending therethrough.

As a result of the connections between the center section 34 and the primary boom segment 38 about the first hinge 48, the connection of the primary boom segment 38 and the secondary boom segment 40 about the second hinge 54, and the connection of the breakaway boom segment 42 about the third hinge 60, the respective boom segments are hinged to each other to allow the boom arm 36 to fold into a folded-storage or transport position and unfold into its extended or unfolded use-position. For instance, FIGS. 1-3 show the boom arm 36 in a completely unfolded, extended configuration in which the sprayer 10 is ready for use. In the extended position, the segments 38, 40, 42 of the boom 30 are oriented in line with each other so as to extend outwardly and be cantilevered from the lift arm assembly 32 of the sprayer 10. In this position, all of the segments 38, 40, 42 are maintained parallel to the ground and are generally oriented along the same axis.

Figure 6:
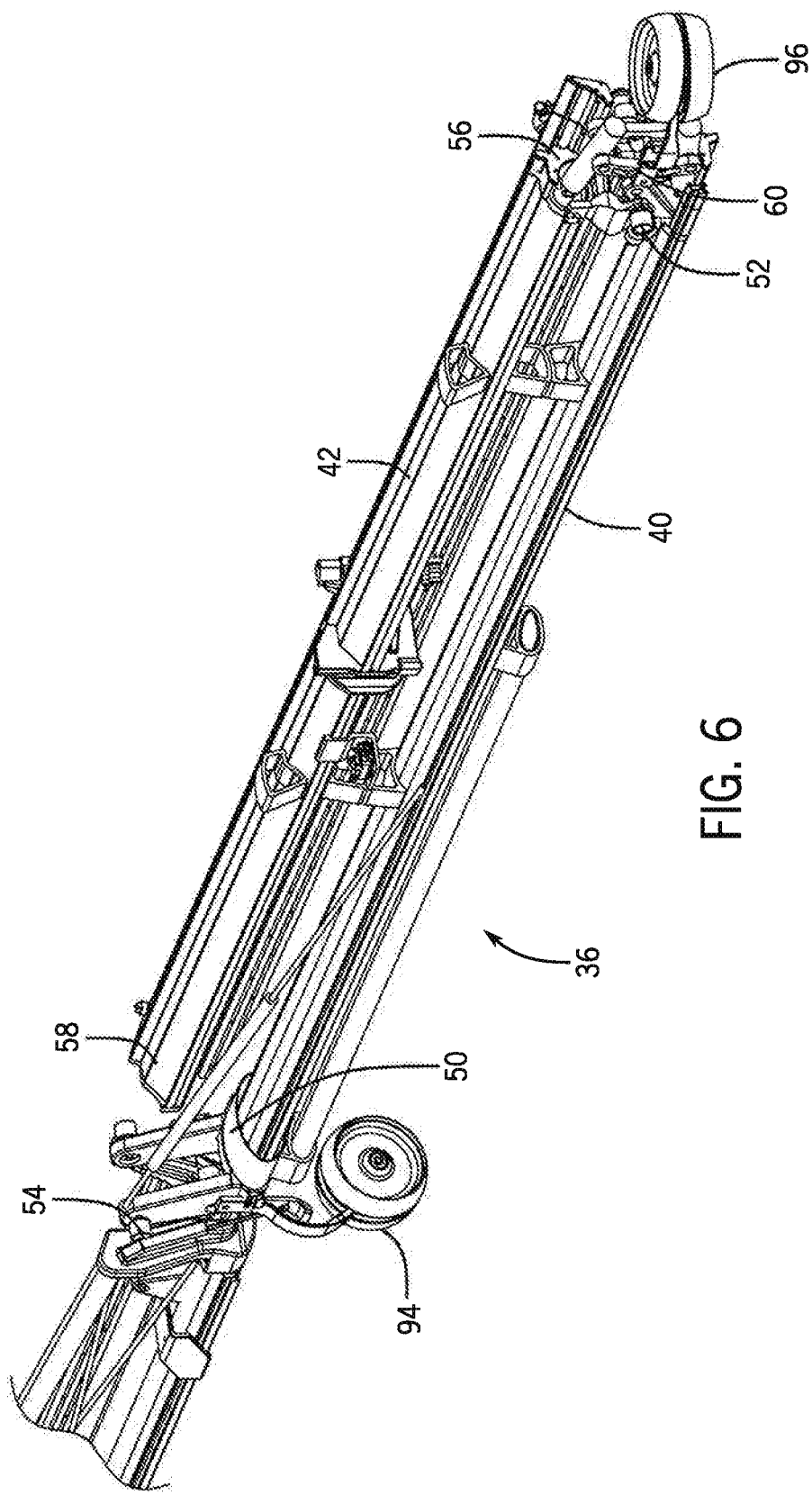
FIG. 6 is an enlarged perspective view of the middle section of the spray boom truss of FIGS. 4 and 5.

Next, FIGS. 4-6 show the boom arni 36 is a partially folded position, in which the breakaway boom segment 42 is folded about the third hinge 60 initially vertically upwardly until the breakaway boom segment 42 is located directly above the third hinge 60. From there, the breakaway boom segment 42 continues to fold vertically downwardly towards the second boom segment 40 until it is in an inverted position and it rests substantially on top of the secondary boom segment 40. In this way, the breakaway boom segment 42 is oriented parallel to the secondary boom segment 40 but is vertically displaced from the secondary boom segment 42.

Figure 7:
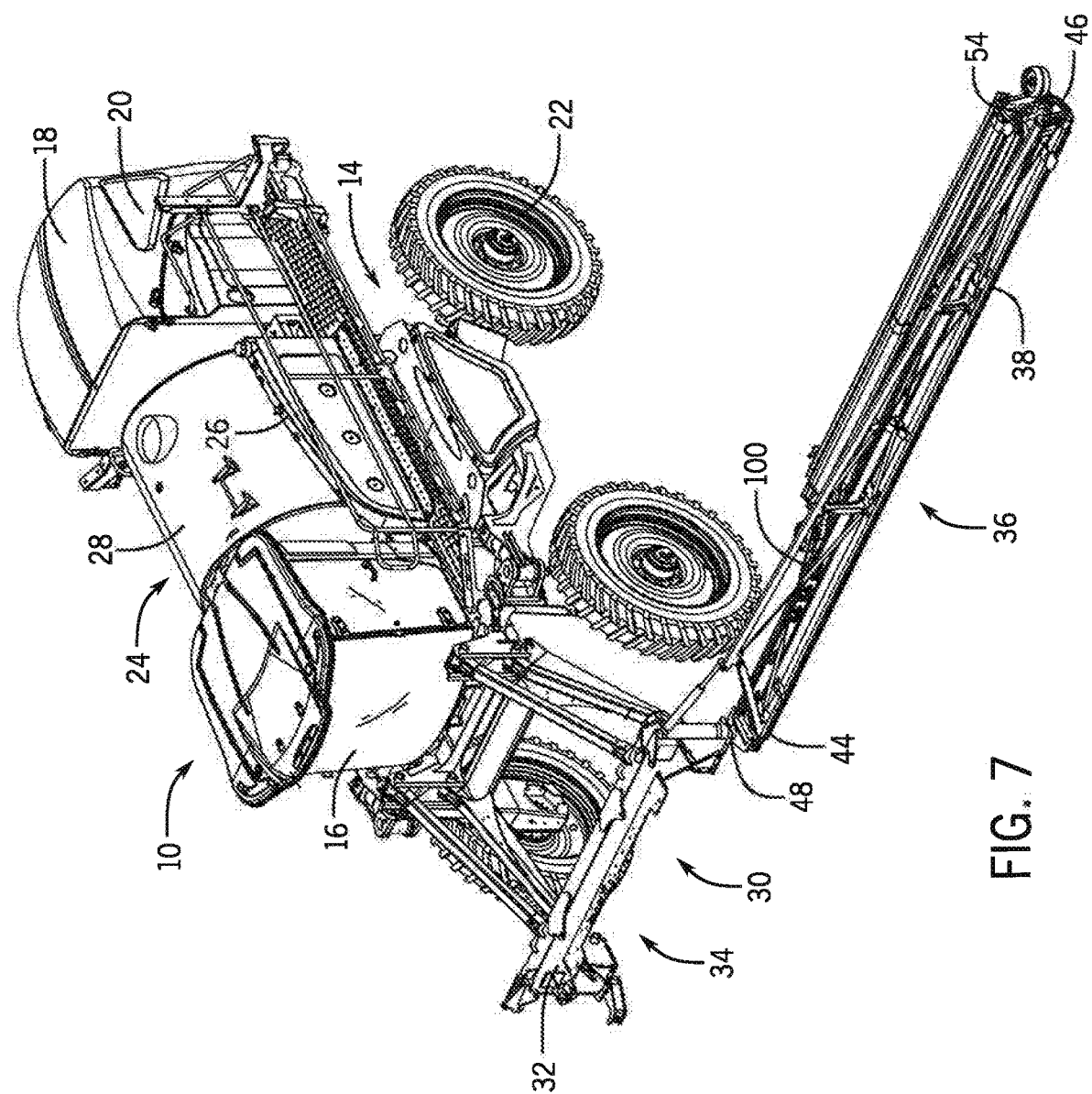
FIG. 7 is a perspective view of the agricultural sprayer where the spray boom truss in a completely folded position.
Figure 8:
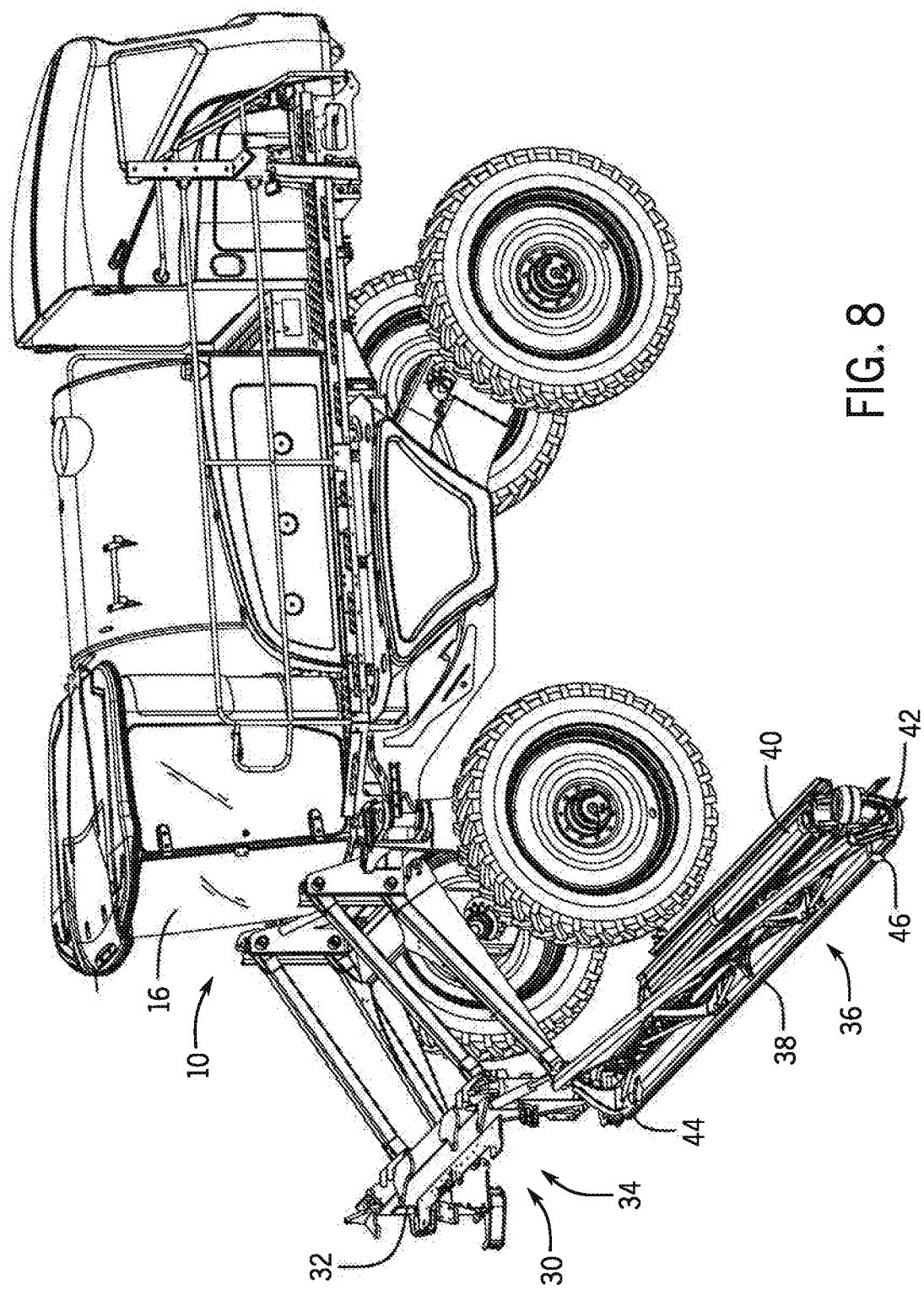
FIG. 8 is an enlarged front perspective view of the agricultural sprayer of FIG. 7 in a completely folded position.
Figure 9:
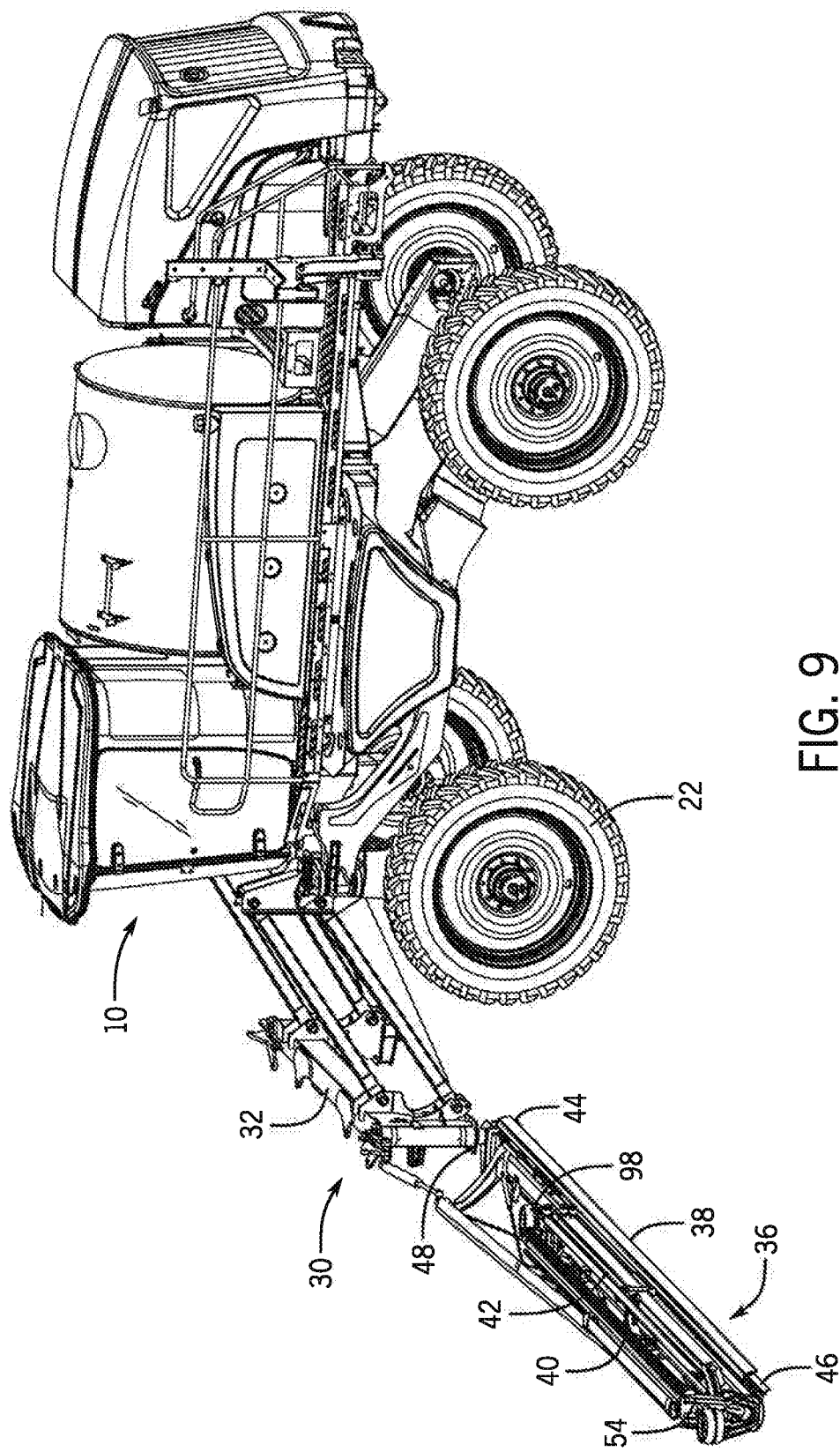
FIG. 9 is an enlarged rear perspective view of the agricultural sprayer of FIGS. 7 and 8.

Further still, FIGS. 7-9 show the boom arm 36 in a folded configuration, in which the secondary boom segment 40 is folded about the second hinge 54 initially vertically upwardly until the secondary boom segment 40 is located directly above the second hinge 54. The second boom segment 40 continues to fold vertically downwardly towards the primary boom segment 38 such that both the breakaway boom segment 42 and the secondary boom segment 40 are located in a compact confirmation above the primary boom segment 38. In this way, each of the primary boom segment 38, the secondary boom segment 40, and the breakaway boom segment 42 are oriented parallel to one another, while each are vertically displaced from one another. As shown, the breakaway boom segment 42 is located between the primary boom segment 38 and the secondary boom segment 40.

Figure 10:
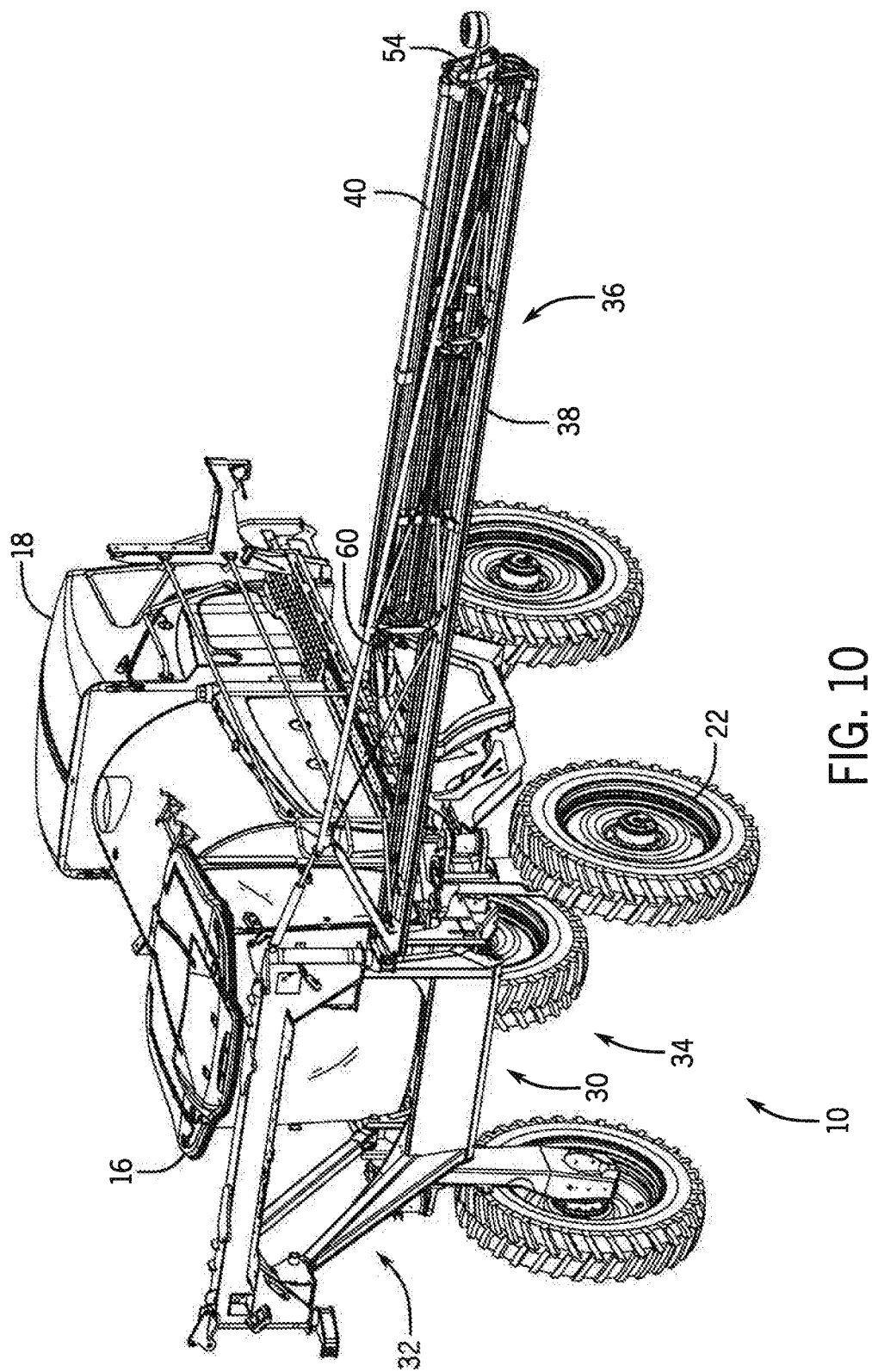
FIG. 10 is a perspective view of the agricultural sprayer where the spray boom truss is in a lifted position.
Figure 11:
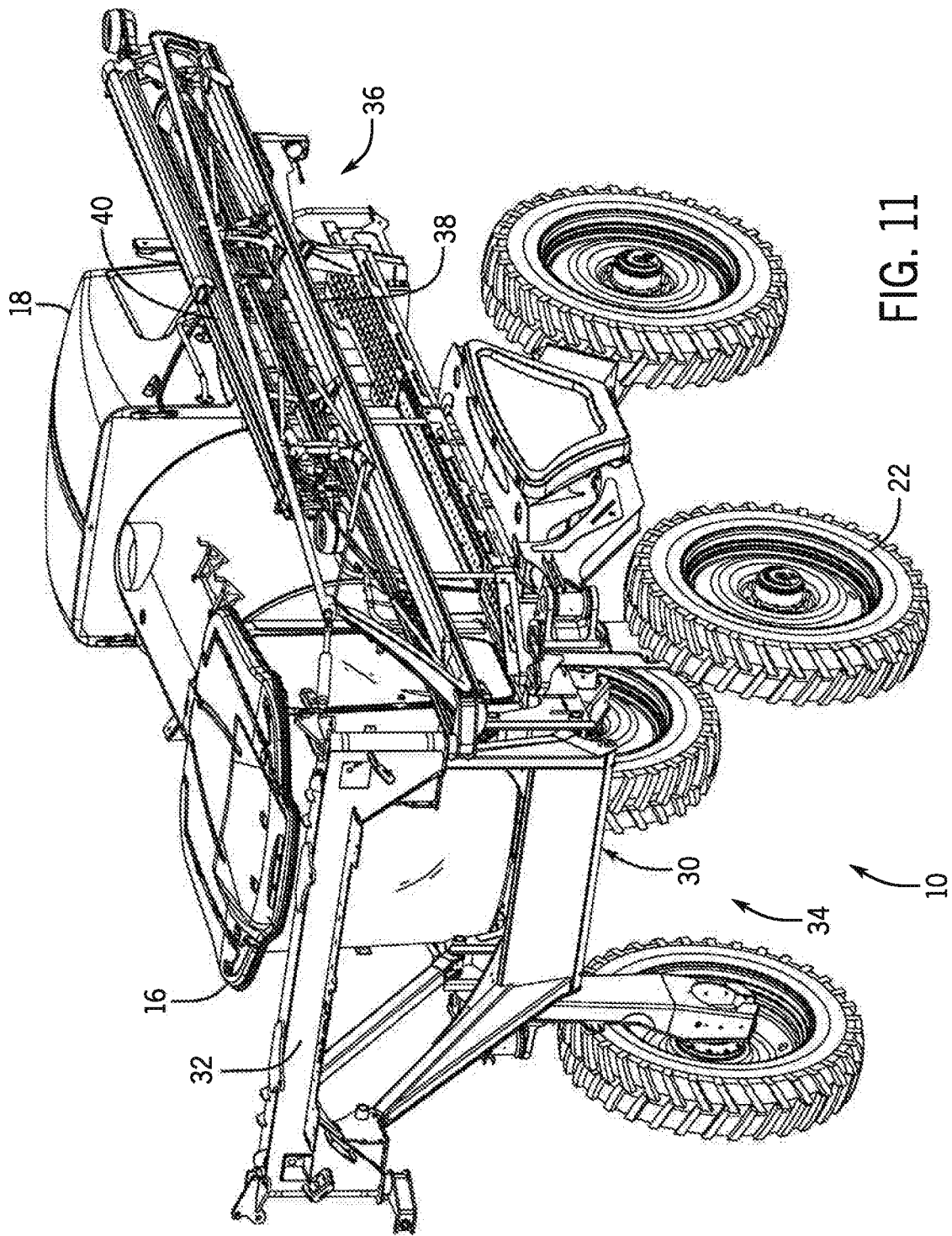
FIG. 11 is a perspective view of the agricultural sprayer where the spray boom truss is in a retracted position.
Figure 12:
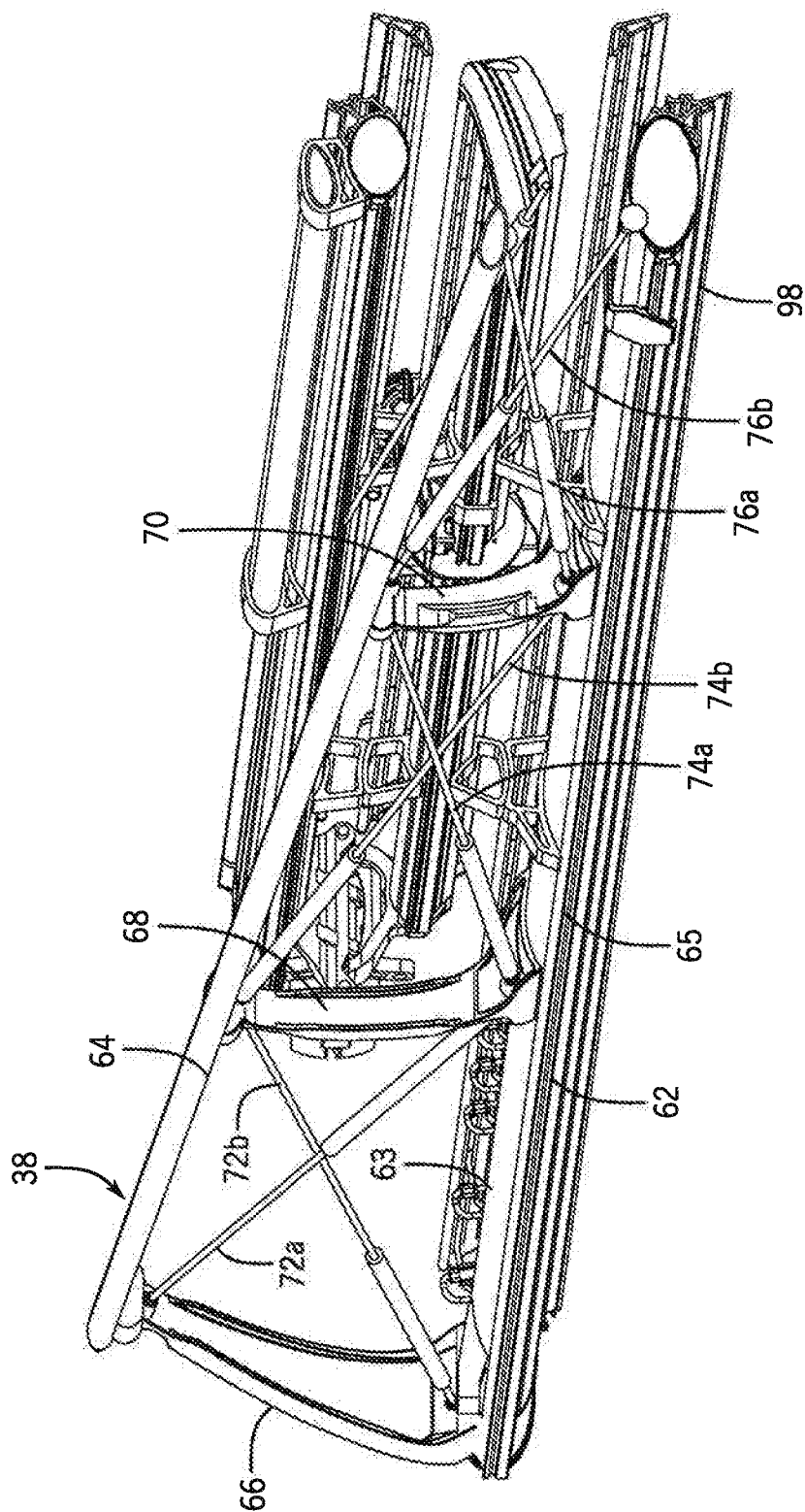
FIG. 12 is an enlarged front perspective view of the spray boom truss in a folded position.
Figure 13:
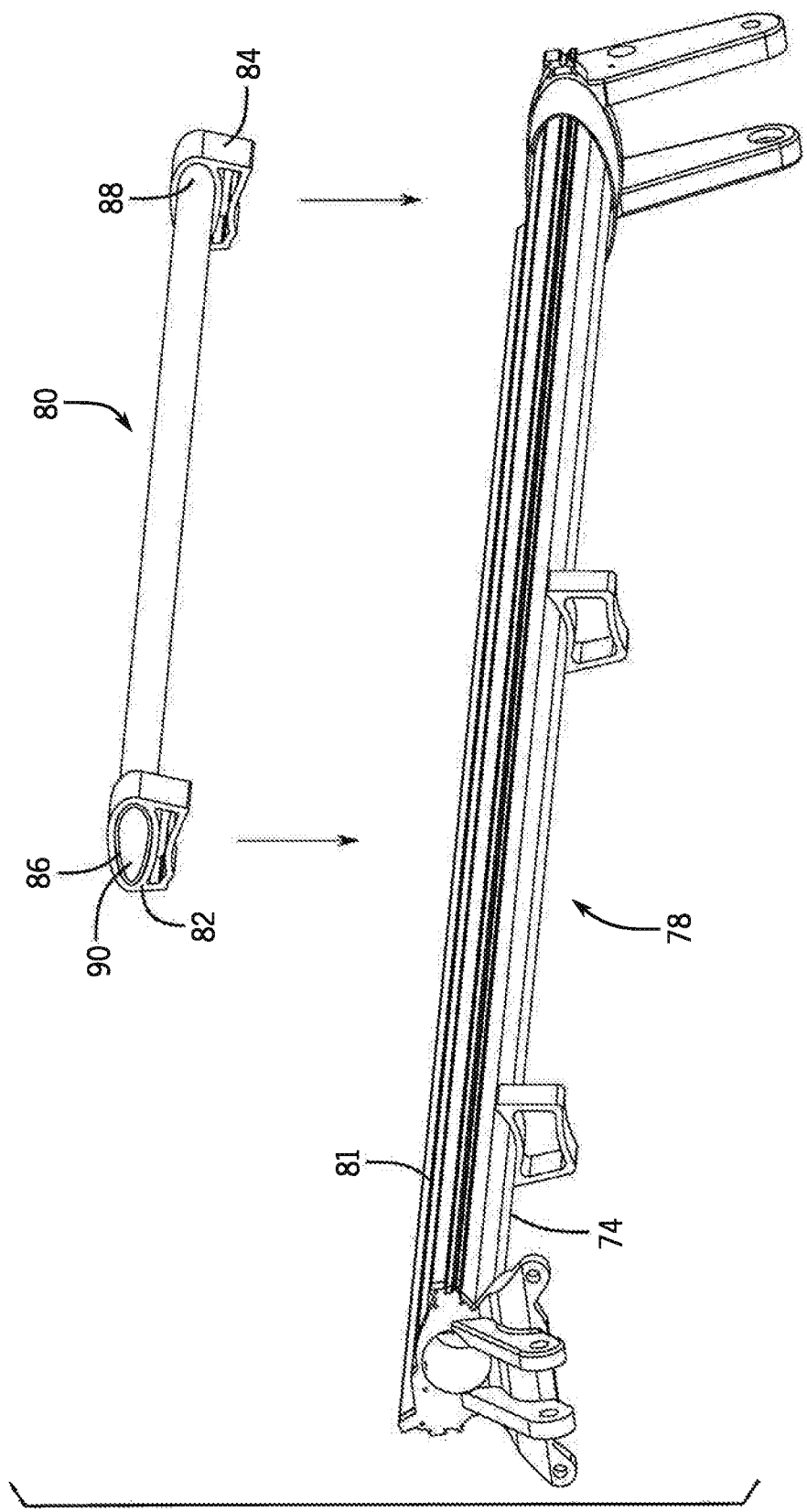
FIG. 13 is an enlarged exploded perspective view of the secondary boom segment of the spray boom truss.

From here, the boom arm 36 can be raised by the lift arm assembly 32, as shown in FIG. 10. From the raised position, the primary boom segment 38, and by extension the secondary boom segment 40 and the breakaway boom segment 42 due to their location directly above the primary boom segment 38, can be pivoted relative to the center section 34 and the sprayer 10 about the first hinge 48. As a result, the boom arm 36 can be folded into a compact design where the breakaway boom segment 42 and the secondary boom segment 40 are folded onto the primary boom segment 38, after which the boom arm 36 is rotated towards the chassis 12, such that it is substantially parallel with the length of the sprayer 10 as shown in FIG. 11. Obviously, once the boom arm 36 is collapsed to the retracted position of FIG. 11, the sprayer 10 can more easily be moved for transport.

Each of the boom segments may define a framework of interconnected base members, stringers, andior other components. Initially, the primary boom segment 38 will be described. As shown, the primary boom segment 38 primarily includes a base support member 62 that extends substantially horizontally from the first end 44 to the second end 46. For instance, the base support member 62 is an elongate, generally cylindrical in shape, substantially hollow tube that is made of durable material such a carbon fiber. The base support member 62 may include a top side 63 and a bottom side 65. As shown in FIGS. 1-9, the base support member 62 is located adjacent to the ground unless it is raised using the lift arm assembly 32. The primary boom segment 38 additionally includes an upper support stringer 64 that also extends along the top side 63 substantially across the length the primary boom segment 38. The upper support stringer 64 may extend angularly from the first end 44 to the second end 46. More specifically, the upper support stringer 64 may extend downwardly from the first end 44 towards the second end 46, such that the spacing between the base support member 62 and the upper support stringer 64 is greatest at the first end 44 and smallest at the second end 46 to provide maximum structural integrity of the boom arm 36.

The primary boom segment 38 may include additional supports extending between the base support member 62 and the upper support stringer 64. As shown, the primary boom segment 38 also includes a first angled support truss element 66 secured at the first end 44 to the base support member 62 that extends upwardly and outwardly to the upper support stringer 64. Additional support truss elements, for instance first and second vertical support truss elements 68, 70 extend upwardly from the base support member 62 to the upper support stringer 64. The vertical support truss elements 68, 70 may be of an I-beam structure that is both strong in compression and bending, but still allows for axial torsion. As shown, the primary boom segment 38 includes a single angled support truss element 66 and two vertical support truss elements 68, 70 located substantially equidistant along the length of the primary boom segment 38. Of course, these support truss elements 66, 68, 70 could similarly be spaced closer to one another or further from one another depending on the support characteristics needed for the primary boom segment 38. Furthermore, additional support truss elements could also be included, depending on the length and the weight of the various boom segments 38, 40, 42.

As shown, the primary boom segment 38 also includes additional diagonal truss elements that extend angularly from the base support member 62 to the upper support stringer 64 at the location of the support truss elements 66, 68, 70. These truss elements may help to dissipate energy accumulated in the structure as it flexes. More specifically, the illustrated embodiment includes a first pair of diagonal truss elements 72a, 72b that extends from the location where the angled support truss element 66 meets the upper support stringer 64 to the location where the first vertical support truss element 68 meets the base support member 62. A second pair of diagonal truss elements 74a, 74b may extend from the location where the first vertical support truss element 68 meets the base support member 62 to the location where the second vertical support truss element 70 meets the upper support stringer 64. Further still, a third pair of diagonal truss elements 76a, 76b may extend from the location where the second vertical support truss element 70 to the first hinge 48. In this way, the diagonal truss element 72, 74, 76 alternate diagonally in orientation. Again, the primary boom segment 38 may feature additional support diagonal truss elements depending on a number of factors including the length and weight of the various boom segments 38, 40, 42.

Turning next to FIGS. 3, 5, and 6, the secondary boom segment 40 is shown with greater detail. In comparison to the primary boom segment 38, the overall structure of the secondary boom segment 40 is simplified. More specifically, the second boom segment 40 includes a base support member 78, which has similar characteristics as the base support member 62 of the primary boom segment 38, and an underside support truss member 80 which is mounted to an underside 81 of the base support member 78. For instance, the base support member 78 may be a carbon fiber tube that is generally cylindrical in shape. The base support member 78 has an upper side 79 and the under side 81. Generally speaking, the underside support truss member 80 is made of similar construction of the base support member 78, and is generally elongate, substantially hollow, and made of durable material such a carbon fiber. The underside support truss member 80 additionally has mounting brackets 82, 84 located on either side 86, 88 of the underside support truss member 80 that are used to mount the underside truss support member 80 to the base support member 78. For instance, the mounting brackets 82, 84 may be mounted to the underside support truss member 80 using a rubberized joint 90. The rubberized joint 90 may add vertical dampening to the secondary boom segment 40 and the breakaway boom segment 42. The secondary boom segment 40 may also include a truss element 91 to provide additional support.

As shown, the underside support truss member 80 is mounted directly adjacent to the second hinge 54 at the first end 50 of the secondary boom segment 40 and extends approximately halfway across the second boom segment 40. Of course, the underside support truss member 80 may have different characteristics, including length, width, material, etc., depending on the weight and length of the segments 38, 40, 42. Because of its location directly adjacent but outside of the second hinge 54, the underside support truss member 80 provides adequate reinforcement to the secondary boom segment 40 to support the weight of the entire secondary boom segment 40, as well as the breakaway boom segment 42. As shown, this is achieved without necessitating additional truss elements on the upper side 79 of the secondary boom segment 40, which could get in the way of compact folding of the secondary boom segment 40 and the breakaway boom segment 42 onto the primary boom segment 38. Having the added underside support truss member 80 located beneath the secondary boom segment 40 and outside of the second hinge 54, this frees up the space located directly above the secondary boom segment 40, which in the prior art typically included various support structures like those present in the primary boom segment 38, including various upper support stringers, support brackets, or struts. The illustrated embodiment features a base support member 78 whose upper side is substantially clear of added components, which makes it easier for both the breakaway boom segment 42 to fold onto the top of the secondary boom segment 40, as well as for the folded secondary boom segment 40 and breakaway boom segment 42 to be folded together onto the top side 63 of the primary boom segment 38. Additionally, by having a clear upper side 79 of the secondary boom segment 40, when all three of the boom segments 38, 40, 42 are folded together, the resultant folded shape is much more compact than prior art boom arms that had multiple support components located on the upper side of the secondary boom segment.

Like both the primary boom segment 38 and the secondary boom segment 40, the breakaway boom segment 42 may also have a base support member 92 that is elongate, generally cylindrical in shape, and substantially hollow tube that is made of durable material such a carbon fiber. Additionally, the sprayer 10 may include multiple wheels located about the boom segments to support the various sections of the boom 30. For instance, as shown a first wheel 94 may be located beneath the first hinge 48 and a second wheel 96 may be located beneath the second hinge 54. The wheels 94, 96 are configured to extend from the boom 30 and contact the ground in order to assist in supporting the boom 30 when it is in the extended position.

Additionally, the sprayer 10 may include nozzle lines 98 that extend along the boom 30 and supplies product to a number of nozzles 100 disposed on the rear side of the boom segments 38, 40, 42. The nozzles 100 may be disposed at any interval along either the entire length of the boom segments 38, 40, 42 or a partial length of the boom segments 38, 40, 42. Similarly, the nozzle lines 98 may extend along the entire length of the boom segments 38, 40, 42 or a partial length of the boom segments 38, 40, 42. In the illustrated embodiment, the underside support truss member 80 is located below the nozzle line 98.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A boom truss with inverted truss geometry for an agricultural spray boom for use with an agricultural machine, the boom truss comprising:
   a primary boom segment extending from the agricultural machine comprising:
      a base support member with a top side and a bottom side; and a support truss structure extending upwardly from the top side;
a secondary boom segment extending from the primary boom segment comprising:
a base support member with an upper side and an underside, the base support member being without support structures extending from the upper side; and
an underside support member mounted to the base support member, the underside support member being configured to reinforce the secondary boom segment;
a nozzle line extending along the primary boom segment and the secondary boom segment, the nozzle line being supported on the secondary boom segment separately of the underside support member; and
a first hinge located between the primary boom segment and the secondary boom segment;
wherein the secondary boom segment is pivotable about a horizontal axis defined by the first hinge from a first position about the horizontal axis to a second position about the horizontal axis, wherein, in the first position, the secondary boom segment extends laterally outwardly from the primary boom segment with the underside support member extending downwardly from the underside, and wherein, in the second position, the secondary boom segment is folded so that the upper side is located directly above the top side; and
wherein the secondary boom segment moves about the horizontal axis from the first position upwardly until the secondary boom segment is directly above the first hinge and from directly above the first hinge downwardly to the second position.

2. The boom truss of claim 1,
wherein the underside support member is located laterally adjacent to and outside of the first hinge when the secondary boom segment is in the first position.

3. The boom truss of claim 1,
wherein the underside support member is located below the nozzle line when the secondary boom segment is in the first position.

4. The boom truss of claim 1, further comprising a breakaway boom segment having a base support member;
wherein the breakaway boom segment extends from the primary boom segment in an extended position.

5. The boom truss of claim 4, further comprising a second hinge located between the secondary boom segment and the breakaway boom segment;
wherein the breakaway boom segment moves about a second horizontal axis defined by the second hinge from the extended position to a partially collapsed position, the breakaway boom segment being located directly above the secondary boom segment in the partially collapsed position.

6. The boom truss of claim 5, wherein the secondary boom segment and the breakaway boom segment are folded to the second position.

7. The boom truss of claim 6, wherein the support truss structure further comprises:
an upper support stringer;
a plurality of vertical support truss elements; and
a plurality of diagonal truss elements.

8. The boom truss of claim 7, wherein the secondary boom segment and the breakaway boom segment are nested behind the support truss structure when in the second position.

9. The boom truss of claim 8, further comprising a third hinge located where the primary boom segment attaches to the agricultural machine;
wherein the primary boom segment, the secondary boom segment, and the breakaway boom segment pivot about the third hinge towards the agricultural machine into a retracted transportation position.

10. The boom truss of claim 1, wherein the underside support member comprises:
a substantially hollow, cylindrical carbon fiber tube; and
at least one bracket extending from the substantially hollow, cylindrical carbon fiber tube;
wherein the at least one bracket attaches to the base support member of the secondary boom segment.

11. The boom truss of claim 1, wherein, in the first position, the base support member of the primary boom segment and the base support member of the secondary boom segment both extend along a horizontal axis.

12. An agricultural machine comprising:
a cab having a front, a back, a first side, and a second side;
a lift arm assembly extending from the front;
a boom truss extending from either side of the lift arm assembly, the boom truss comprising:
a first primary boom segment extending from the first side of the agricultural machine comprising:
a first base support member with a top side and a bottom side; and
a first support truss structure extending upwardly from the top side;
a second primary boom segment extending from the second side of the agricultural machine comprising:
a second base support member with a top side and a bottom side; and
a second support truss structure extending upwardly from the top side;
a first secondary boom segment extending from the first side of the first primary boom segment comprising:
a third base support member with an upper side and an underside, the third base support member being without support structures extending from the upper side; and
a first underside support member mounted to the third base support member, the first underside support member being configured to reinforce the first secondary boom segment;
a second secondary boom segment extending from the second side of the second primary boom segment comprising:
a fourth base support member with an upper side and an underside, the fourth base support member being without support structures extending from the upper side; and
a second underside support member mounted to the fourth base support member, the second underside support member being configured to reinforce the second secondary boom segment;
a first nozzle line extending along the first primary boom segment and the first secondary boom segment, the first nozzle line being supported on the first secondary boom segment separately of the first underside support member;
a second nozzle line extending along the second primary boom segment and the second secondary boom segment, the second nozzle line being supported on the second secondary boom segment separately of the second underside support member;

a first hinge located between the first primary boom segment and the first secondary boom segment; and a second hinge located between the second primary boom segment and the second secondary boom segment;

wherein the first and second secondary boom segments are pivotable about a respective horizontal axis from a first position about the respective horizontal axis to a second position about the respective horizontal axis, wherein, in the first position, the first and second secondary boom segments extend laterally outwardly from the first and second primary boom segments, the first underside support member extends downwardly from the underside of the third base support member, and the second underside support member extends downwardly from the underside of the fourth base support member, and wherein, in the second position, the first and second secondary boom segments are folded so that the upper sides of the first and second secondary boom segments are located directly above the top sides of the first and second primary boom segments;

wherein the first secondary boom segment moves about the respective horizontal axis defined by the first hinge from the first position upwardly until the first secondary boom segment is directly above the first hinge and from directly above the first hinge downwardly to the second position; and wherein the second secondary boom segment moves about the respective horizontal axis defined by the second hinge from the first position upwardly until the second secondary boom segment is directly above the second hinge and from directly above the second hinge downwardly to the second position.

13. The agricultural machine of claim 12, wherein each of the first and second underside support member comprises:

a substantially hollow, cylindrical tube made of carbon fiber; and at least one bracket extending from the substantially hollow, cylindrical tube;

wherein the at least one bracket attaches to the one of the first and second base support members of one of the first and second secondary boom segments.

14. The agricultural machine of claim 12, further comprising:

a first breakaway boom segment having a base support member that extends from the first side of the first secondary boom segment; and a second breakaway boom segment having a base support member that extends from the second side of the second secondary boom segment.

15. The agricultural machine of claim 14, further comprising:

a third hinge located between the first secondary boom segment and the first breakaway boom segment; and a fourth hinge located between the second secondary boom segment and the second breakaway boom segment;

wherein the boom segments are moveable between:

the first position where the first and second primary boom segments, the first and second secondary boom segments, and the first and second breakaway boom segments extend laterally from the first and second sides;

an intermediate position where the first and second breakaway boom segments are pivoted about the third and fourth hinges such that the first and second breakaway boom segments are located directly above the first and second secondary boom segments; and the second position where the first and second secondary boom segments are pivoted about the first and second hinges such that the first and second secondary boom segments are located directly above the first and second primary boom segments.

16. The agricultural machine of claim 15, the first and second secondary boom segments and the first and second breakaway boom segments are stacked above the first and second primary boom segments in the second position.

17. The agricultural machine of claim 16, further comprising:

a fifth hinge located where the first primary boom segment attaches to the lift arm assembly at the first side; and a sixth hinge located where the second primary boom segment attaches to the lift arm assembly at the second side;

wherein the first primary boom segment is pivotable between:

the second position; and a fourth position where the first primary boom segment is pivoted about the fifth hinge towards the back so that the first primary boom segment, the first secondary boom segment, and the first breakaway boom segment are substantially parallel with the first side;

wherein the second primary boom segment is pivotable between:

the second position; and a fourth position where the second primary boom segment is pivoted about the sixth hinge towards the back so that the second primary boom segment, the second secondary boom segment, and the second breakaway boom segment are substantially parallel with the second side.

18. A boom truss for use with an agricultural machine comprising:

a primary boom segment extending from the agricultural machine comprising:

a base support member with a top side and a bottom side; and a support truss structure extending upwardly from the base support member;

a secondary boom segment extending from the primary boom segment comprising:

a base support member with an upper side and an underside, the base support member being without support structures extending from the upper side; and an inverted underside support member mounted to the base support member, the inverted underside support member being configured to reinforce the secondary boom segment;

a breakaway boom segment extending from the secondary boom segment;

a nozzle line extending along the primary boom segment and the secondary boom segment, the nozzle line being supported on the secondary boom segment separately of the inverted underside support member; and a first hinge located between the primary boom segment and the secondary boom segment;

wherein the secondary boom segment is pivotable about a horizontal axis defined by the first hinge from a first position about the horizontal axis to a second position about the horizontal axis, wherein, in the first position, the secondary boom segment extends laterally outwardly from the primary boom segment, and the inverted underside truss support member extends downwardly from the base support member, and wherein, in the second position, the secondary boom segment is folded so that the secondary boom segment is located directly above the primary boom segment; and wherein the secondary boom segment moves about the horizontal axis from the first position upwardly until the secondary boom segment is directly above the first hinge and from directly above the first hinge downwardly to the second position.

19. The boom truss of claim 18, further comprising:

a second hinge located between the secondary boom segment and the breakaway boom segment with a second pivot axis extending therethrough;

wherein the horizontal axis is a first pivot axis; and wherein the boom segments are pivotable between:

the first position wherein the secondary boom segment extends outwardly from the primary boom segment and the breakaway boom segment extends outwardly from the secondary boom segment;

an intermediate position wherein the breakaway boom segment is pivoted about the second pivot axis such that the breakaway boom segment is located directly above the secondary boom segment; and the second position wherein the secondary boom segment is pivoted about the first pivot axis such that the secondary boom segment is located above the primary boom segment and wherein the breakaway boom segment is located between the primary boom segment and the secondary boom segment.

20. The boom truss of claim 19, wherein the inverted underside support member is located below the nozzle line when the secondary boom segment is in the first position; and wherein the inverted underside support member is located laterally adjacent to and outside of the first hinge when the secondary boom segment is in the first position.

* * * * *